Patented Aug. 1, 1933

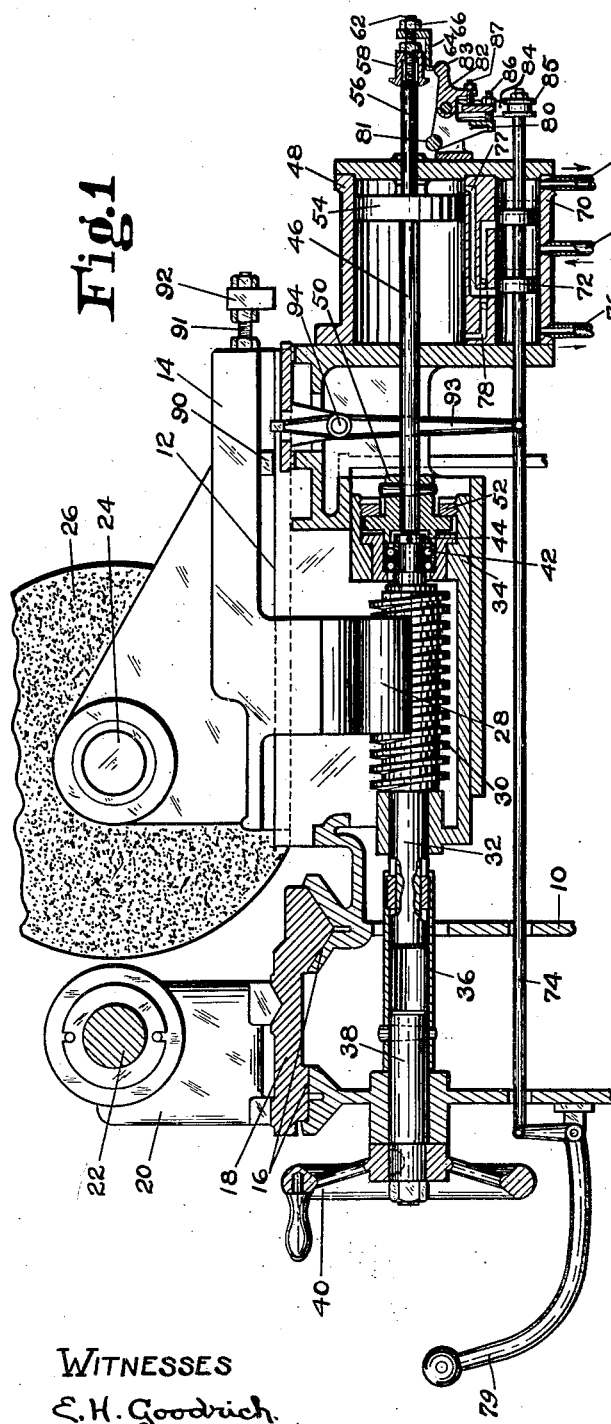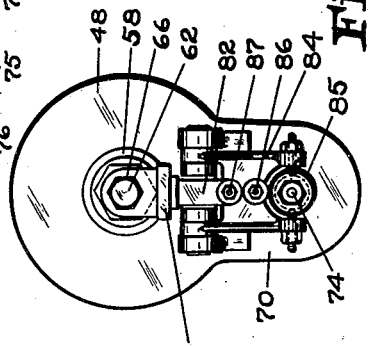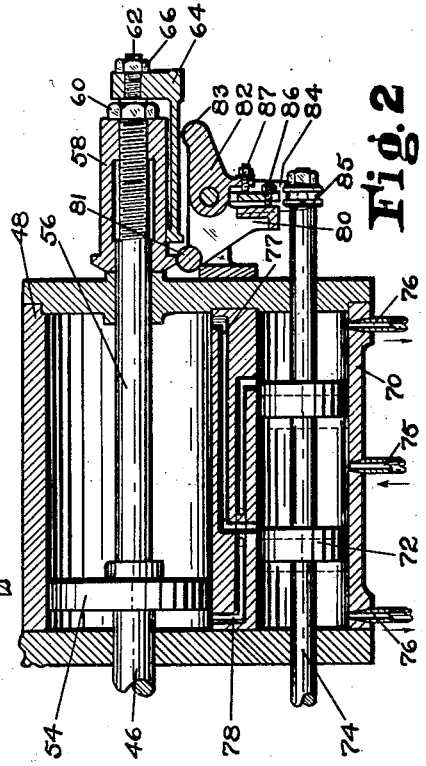

1,920,228

UNITED STATES PATENT OFFICE 1,920,228

FEEDING MECHANISM FOR MACHINE TOOLS

Wallace H. Wood, Worcester, Mass., assignor to Norton Company, Worcester, Mass., a Corporation of Massachusetts Application September 25, 1929. Serial No. 395,008

11 Claims. (Cl. 51—95.)

This invention relates to feeding mechanisms for machine tools wherein it is desirable to effect a relative movement of the work and operating tool at different rates of speed, first to establish an initial relation between the two and then to effect a feeding movement. While certain features of the invention are of general application, they may with particular advantage be embodied in grinding machines wherein the work and the grinding element are moved in the manner indicated. Accordingly, the invention will be disclosed in its application to grinding machines.

In the operation of certain types of grinding machines, it is desirable that the feed mechanism be so organized as to bring the grinding wheel and the work rapidly into close proximity and thereafter to permit a relative feeding movement of the work and wheel slowly and with great precision for effecting the grinding operation. After this has been completed, it is desirable to effect a rapid separation of the work and the wheel to permit the removal of the ground work piece and its replacement by a rough blank. In one aspect my invention consists in a feeding mechanism wherein a feed screw is utilized for effecting the grinding feed and a fluid pressure system or other power-operated mechanism is utilized for bodily moving the feed screw to effect the preliminary and final rapid approaching and separating movement of the work and grinding wheel.

An important feature of my invention consists in power-operated mechanism for bodily moving the feed screw together with its associated carriage, arranged to be manually controlled by the operator in the initiation of the approaching and separating movement and having provision for automatically terminating or regulating such movements without requiring the operator's attention. For example, after the grinding feed has been completed, the operator, by shifting a suitable controlling device, may cause the grinding wheel carriage to be retracted at a rapid rate, and in accordance with one feature of my invention this movement is automatically terminated at a predetermined adjustable point determined by the requirements of the work in hand. In the same way, the operator may initiate the rapid advancing movement of the grinding wheel carriage toward the work and this may be automatically terminated or the character of the movement varied automatically at a predetermined adjustable point in the travel of the carriage. Under these circumstances, the operator is free to devote his entire energy to controlling the precision of the grinding feed, whereas the movements of the machine requiring less precision are effected without the expenditure of either attention or energy on his part.

In the illustrated embodiment of the invention I have shown the advancing and receding movements of the carriage controlled automatically by the bodily movement of the feed screw to different predetermined points in its path of travel. Inasmuch, however, as the feeding movement of the machine is effected by a relative movement of the carriage with respect to the feed screw, I contemplate the provision of means actuated by the movement of the carriage itself to predetermined points in its path of travel for controlling the power-operated advancing and retracting movements of the carriage. The provision of such means contributes to the safety and reliability of operation of the machine by preventing the movement of the carriage into abnormal positions, which otherwise might occur due to carelessness or mistake on the part of the operator. For example, if the power-operated movement of the carriage were to be initiated with the carriage in position on the feed screw corresponding to the termination of the grinding feed, the grinding wheel might be brought violently into contact with the new blank unless arrested by the operation of the carriage in being moved into predetermined position for checking the rapid advancing preliminary movement thereof.

The invention is herein disclosed as employing a fluid pressure system for effecting the power-operated movements of the feed screw and the action of the system is, accordingly, controlled by a valve arranged to be shifted automatically in the movement of the feed screw or, alternatively, in the movement of the carriage regardless of its position with respect to the feed screw. Fluid pressure mechanism presents many advantages in compactness of structure, smoothness of operation and precision in effect, and for these reasons is preferred, although it would be within the scope of the invention to effect the results herein disclosed by mechanical rather than fluid pressure means.

It will be understood that in utilizing the feed screw as an element of the mechanism for rapidly moving the carriage, the highest precision of operation can be secured only by eliminating the back lash, which is unavoidable in the mounting of the feed screw and its connection to the carriage. This is effected in accordance with another feature of my invention by providing means for exerting a continuing pressure on the feed screw in one direction throughout its entire advancing movement, both in its initial positioning movement and in its grinding feed movement and until the conclusion of the grinding operation. This may be conveniently effected where a fluid pressure system is utilized by throttling the fluid flow in the system after the preliminary approaching movement of the carriage has been completed and thus maintaining a continuing and uniform fluid pressure against one end of the feed screw.

These and other features of the invention will be best understood and appreciated from the following description of a preferred embodiment thereof, selected for purposes of illustration and shown in the accompanying drawing, in which Fig. 1 is a view of a portion of the grinding machine showing the wheel slide operating mechanism in section;

Fig. 2 is a sectional view, on an enlarged scale, of the operating cylinder and valve; and Fig. 3 is a corresponding view in rear elevation.

The invention is herein shown as embodied in a cylinder grinding machine, comprising a base or casing 10 having transversely disposed ways 12 for the grinding wheel carriage 14 and longitudinally disposed ways 16 for the work carriage 18. The work carriage is provided with the usual head and tailstocks for supporting and rotating the work to be ground. In Fig. 1, the tailstock 20 is shown and the work piece is represented as a shaft 22. The work carriage 18 may be traversed longitudinally of the machine and the headstock driven to rotate the work piece by mechanism of any usual or well-known construction, the details of which are omitted for the sake of clearness.

The grinding wheel carriage 14 is provided with journals for the grinding wheel shaft 24 on which the grinding wheel 26 is mounted, and this also may be driven in any convenient manner. The carriage 14 is provided with a downwardly extending arm terminating in a cylindrical boss 28, in the semicylindrical surface of which is formed a thread fitting the thread 30 of the feed screw shaft 32. The shaft 32 is journaled in bearings formed in the carriage 34 mounted in the machine frame for transverse movement from front to rear. The feed screw shaft 32 is thus mounted for rotation and also for endwise bodily movement in the carriage 34.

At its forward end the feed screw shaft 32 is splined to a sleeve 36 which is pinned to the inner end of the feed shaft 38 journaled in the frame of the machine, and provided at its outer end with a hand wheel 40. This is utilized to rotate the feed screw shaft for the purpose of hand feeding the grinding wheel to effect the grinding feed, the spline connection between the shaft 38 and the screw shaft 32 permitting relative endwise movement of the two, as will be apparent.

The mechanism for bodily moving the screw shaft 32 will now be described. This shaft is provided at its rear end with thrust bearings 42 and with a hardened collar 44 against which abuts the forward end of the piston rod 46 of a fluid pressure cylinder 48 which is bolted to the rear side of the machine casing. A flanged head 50 is pinned to the forward end of the piston rod and is retained in the carriage 34 by a ring 52 threaded into the rear end of the latter. The carriage 34 is moved forwardly at high speed for establishing the grinding wheel in initial grinding position by the pressure of the piston rod 46 against the hardened collar 44 of the feed screw, and rearwardly away from the work by the engagement of the flanged head 50 with the ring 52.

The piston rod 46 is provided with a piston 54 fitting the cylinder and with a rearwardly extending portion 56 which extends out through the cylinder head, where it is provided with an adjustable sleeve 58 threaded on the extension and provided with a check nut 60. The extreme end of the extension 56 is reduced to form a threaded stem 62, upon which is adjustably mounted a flanged stop 64 provided with a check nut 66.

Beneath the cylinder 48 is a cylindrical valve chamber 70 having a balanced cylindrical valve 72 carried by a valve rod 74 which extends through both ends of the valve chamber. Fluid pressure is admitted to the center of the valve chamber through an inlet pipe 75 and is exhausted through outlet ports 76 disposed at the opposite ends of the chamber. A passage 77 leads from the valve chamber to the rear end of the cylinder 48 and a second passage 78 extends from the valve chamber to the forward end of the cylinder. The valve 72 is set so that in its neutral position the passage 77 is slightly open so that fluid pressure is effective against the rear face of the piston 54. Consequently, back lash is taken out of the feed screw always in the same direction and leakage in the system is compensated so that uniform pressure conditions may be relied upon.

The valve rod 74 is arranged to be shifted both automatically and manually. It is connected at its forward end to the short arm of a bell crank operating lever 79 pivotally mounted at the front of the machine casing. When this lever is swung inwardly or toward the right, as in Fig. 1, the valve 72 is shifted from the neutral position shown in Fig. 2 toward the rear to the position shown in dotted lines in Fig. 1, in which the passage 77 is closed and the passage 78 opened, admitting fluid pressure to the forward end of the cylinder 48 and moving the feed screw 32 bodily toward the rear with the grinding wheel carriage. Similarly, by throwing the controlling lever 79 forwardly, the valve 72 may be moved forwardly to close the passage 78, opening the passage 77 and admitting fluid pressure to the rear end of the cylinder 48 behind the piston 54 for advancing the feed screw 32. The forward movement of the piston rod 46 is adjustably limited by the engagement of the stop sleeve 58 with a boss formed on the cylinder head, the limiting position being shown in Fig. 2.

The valve rod 74 is automatically shifted by a two-part shifting lever which is swung in opposite direction by the stop sleeve 58 and the flanged stop 64. The principal part 80 of the valve shifting lever is pivotally mounted in a bracket projecting from the cylinder head beneath the extension 56 of the piston rod, and is provided with a rounded contact point 81 which stands in the path of the flange of the stop sleeve 58 when the lever is rocked clockwise to one extremity of its movement. The secondary portion 82 of the valve shifting lever is provided with a rounded contact portion 83 which stands in the path of the flanged stop 64 when the lever is rocked to the other extremity of its position. A yoke piece 84 is pivotally mounted upon the axis of the valve shifting lever parts and connected at its lower end to a collar 85 on the rear end of the valve rod 74. The yoke has an intermediate web in which is mounted an adjustable stop screw 86 bearing upon the part 80 of the valve shifting lever, and the secondary part 82 of the lever is provided with an adjustable stop screw 87 which bears upon the web of the yoke 84. By suitably setting the adjustable stop screws 86 and 87, the adjustable stop sleeve 58 and the adjustable flanged stop 64, the action of the valve shifting lever may be regulated to a nicety and the point of reversal in the direction of movement of the grinding wheel carriage correspondingly controlled.

In addition to the mechanism above described for controlling the action of the valve with reference to the movement of the piston, mechanism is also provided for controlling the valve with reference to the position of the grinding wheel carriage 14 which, in addition to its movement simultaneously with the feed screw, is moved relatively to the feed screw by the hand wheel 40. This mechanism will limit or prevent the automatic shifting of the grinding wheel if the latter is improperly positioned for automatic movement, as will presently appear. To this end, the grinding wheel carriage 14 is provided with a stop 90 and with a rearwardly extending threaded stem 91 carrying an adjustable stop 92. A lever 93, pivotally mounted upon a stud 94 in the machine frame, is arranged to stand with its upper end in line with and between the stops 90 and 92. At its lower end the lever 93 is pivotally connected to the valve rod 74. When, therefore, the carriage 14 is moved rearwardly, its extreme position is determined by the engagement of the stop 90 with the upper end of the lever 93, whereupon the valve rod 74 is moved forwardly and the valve shifted into its neutral position, and the wheel feed stopped. On the other hand, when the grinding feed has been carried to the point determined by the setting of the stop 92, the upper end of the lever 93 is swung forwardly and the valve rod 74 moved rearwardly to close the passage 77 and move the piston 54 rearwardly.

The operation of the machine will be apparent from the foregoing description but may be summarized as follows. Preliminary settings of the stop 92 and of the valve shifting mechanism are made in accordance with the character of the work to be ground to determine the limits desirable in the automatic movement of the grinding wheel carriage. The inward movement of the carriage is usually such as to bring the grinding wheel barely into touch with the rough surface of the work piece and the outward limit of movement is such as to separate the work piece and grinding wheel sufficiently for convenience in setting up the work piece to be ground and for removing it after the grinding operation. Assuming that these adjustments have been made and that the shaft 22 has been positioned for grinding, the operator will throw the controlling lever 79 forwardly, shifting the valve to open the passage 77. The grinding wheel carriage is thereupon moved rapidly toward the work simultaneously with the bodily movement of the feed screw 30 until this motion is positively arrested by engagement of the stop sleeve 58 with the cylinder head. Just before this occurs, the valve shifting lever is rocked by the stop sleeve in a counter clockwise direction and the valve shifted to its neutral position, as shown in Fig. 2, in which the passage 77 is maintained slightly open to insure a continuing pressure against the rear face of the piston 54. The operator then proceeds to rotate the hand wheel 40, turning the feed screw 32 and continuing the forward movement of the grinding wheel 26 to effect the grinding feed operation of the machine. This is continued until the shaft 22 is reduced to the desired size, whereupon the operator reverses the rotation of the hand wheel 40, moving the feed wheel slide 14 back to its initial position with respect to the feed screw 32, and he will also swing the controlling lever 79 rearward, moving the valve to a position in which the passage 77 is closed and the passage 78 opened. Fluid pressure is thus admitted to the forward face of the piston 54 and the grinding wheel slide rapidly moved in a rearward direction, carrying the grinding wheel away from the work. This movement continues until the flanged stop 64 acts upon the valve shifting lever to rock the latter in a clockwise direction and shift the valve forwardly to nearly close the passage 78. It will be apparent, moreover, that the automatic shifting of the grinding wheel is effected rapidly and accurately without requiring attention on the part of the operator, who may thus concentrate upon the control of the grinding feed movement only.

Having thus described my invention, what I claim as new and desire to secure by Letters Patent of the United States is:

1. Feed mechanism for a machine tool, comprising a carriage, a feed screw connected therewith, means for turning the screw to position the carriage, fluid pressure mechanism for bodily moving the feed screw together with the carriage, a controlling valve for said latter mechanism, and shifting means therefor arranged to be automatically shifted either by the movement of the carriage or feed screw according to which of the two arrives first at a predetermined point in its path.

2. A grinding machine comprising relatively movable carriages for the work and for the grinding wheel, a feed screw connected to one carriage and being rotatable to effect the grinding feed, fluid pressure mechanism for bodily moving the feed screw together with the carriage, a controlling valve, a valve shifting device and adjustable means for positively arresting the bodily movement of the feed screw and for substantially simultaneously shifting said device to throttle the fluid flow so as to stop the carriage.

3. A grinding machine having a rotatable grinding wheel, a carriage, a feed screw connected therewith and rotatable to effect the grinding feed, fluid pressure mechanism for bodily moving the feed screw together with the carriage, a controlling valve for said mechanism, manually operated means for shifting the valve to initiate the movement of the feed screw in either direction, and automatic means including dogs on said carriage for shifting the valve to stop the carriage when it reaches a predetermined position in each direction.

4. A grinding machine having a grinding element, a carriage therefor, a feed screw connected therewith and rotatable to effect the grinding feed, a movable carriage for supporting the feed screw, a piston rod connected to the feed screw carriage, a fluid presure cylinder for the piston rod, a controlling valve for the cylinder, manual means for opening the valve to cause the piston rod to move the feed screw carriage together with said first-mentioned carriage, and automatic means acting at a predetermined but adjustable point in the travel of the piston rod to shift the valve for throttling the fluid flow to the cylinder.

5. A grinding machine having a grinding wheel, a carriage, a feed screw rotatable to move the carriage for the grinding feed, and a fluid pressure system for bodily moving the feed screw together with the carriage, including a piston rod connected to the feed screw, a controlling valve for the system, a rocker for shifting the valve, and separately adjustable stops on the piston rod for swinging the rocker in opposite directions at predetermined points in the travel of the piston rod.

6. A grinding machine having a grinding wheel, a carriage, a feed screw rotatable to move the carriage for the grinding feed, and a fluid pressure system for bodily moving the feed screw together with the carriage, including a cylinder and piston, a piston rod extending through both ends of the cylinder, connected at one end to the feed screw and having at its other end a pair of independently adjustable stops, a valve for the cylinder, and a rocker member directly connected to the valve stem to actuate the valve and arranged to be rocked in opposite directions by said stops.

7. A grinding machine having a grinding wheel, a carriage therefor, a feed screw rotatable to move the carriage relatively to itself and also bodily movable simultaneously with the carriage, and a fluid pressure system for bodily moving the feed screw, including a controlling valve, means connected to the feed screw for shifting the valve when the feed screw reaches a predetermined point in its travel, and means connected to the carriage for shifting the valve when the carriage reaches a predetermined point in its travel regardless of the position of the feed screw.

8. A grinding machine having a work support and a relatively movable carriage for a grinding wheel, a feed screw connected to said carriage and rotatable for moving the same, a slide in which the feed screw is mounted, thrust bearings on the slide to support the feed screw, and a fluid pressure actuated member arranged to move the feed screw bodily together with its slide by endwise pressure on the feed screw and to maintain a continuing pressure thereon.

9. A grinding machine comprising a base, a rotatable grinding wheel, a transversely movable slide therefor, a feed screw operatively connected to the slide and rotatable to effect a grinding feed, a fluid pressure mechanism including a cylinder fixed to the base and a piston therein having a piston rod operatively connected to said feed screw for bodily moving the slide to position the wheel for grinding, a valve for said mechanism, an adjustable member on said piston rod arranged to engage the end of said cylinder and arrest the bodily movement of the screw, and a valve controlling device actuated by said member to throttle said valve when the movement of said screw is arrested, said parts being so arranged that said valve remains partially open so that fluid pressure retains said screw in an arrested position during grinding.

10. A grinding machine having a work support, a rotatable grinding wheel, a wheel slide therefor, a rotatable feed screw operatively connected to move the slide, a second slide beneath the wheel slide, radial and end thrust bearings on the second slide to rotatably support said screw, manual means to rotate said screw to adjust the grinding wheel relative to the second slide, a piston rod operatively connected to move said second slide, and a fluid pressure system including a piston and cylinder, one of which is operatively connected to said rod to move the grinding wheel towards and from the work support.

11. A grinding machine comprising a base, a rotatable grinding wheel, a transversely movable slide therefor, a feed screw operatively connected to the slide and rotatable to effect a grinding feed, a fluid pressure mechanism including a cylinder fixed to the base and a piston therein having a piston rod operatively connected to said feed screw for bodily moving the slide to position the wheel for grinding, a valve for said mechanism, a manually adjustable member to vary the end position of the screw as moved by said piston, and a valve controlling device actuated by said member to throttle said valve when the movement of said screw is arrested, said parts being so arranged that the valve remains partially open so that fluid pressure retains said screw in an arrested position during grinding.

WALLACE H. WOOD.